United States Patent
Hon et al.

(10) Patent No.: US 7,905,691 B2
(45) Date of Patent: Mar. 15, 2011

(54) MACHINE TOOL HAVING FUNCTION OF DETECTING CONTACT BETWEEN TOOL AND WORKPIECE

(75) Inventors: Yonpyo Hon, Yamanashi (JP); Kenzo Ebihara, Yamanashi (JP); Tomohiko Kawai, Yamanashi (JP)

(73) Assignee: Fanu Ltd, Yamanashi (JP)

( * ) Notice: Subject to any disclaimer, the term of this patent is extended or adjusted under 35 U.S.C. 154(b) by 763 days.

(21) Appl. No.: 11/980,391

(22) Filed: Oct. 31, 2007

(65) Prior Publication Data

US 2008/0101881 A1    May 1, 2008

(30) Foreign Application Priority Data

Oct. 31, 2006  (JP) ................................. 2006-295216

(51) Int. Cl.
  *B23D 5/00*  (2006.01)
  *B23Q 15/24*  (2006.01)
  *B23Q 17/22*  (2006.01)
  *G05B 19/402*  (2006.01)

(52) U.S. Cl. ........ 409/292; 409/289; 700/192; 700/193; 702/95; 702/158; 318/687; 318/602

(58) Field of Classification Search .................. 409/292, 409/289, 80, 79; 700/192, 193, 173, 175; 318/687, 575–579, 602, 461–464, 648, 649; 702/87–88, 94–95, 105, 150, 151, 152, 155, 702/158, 161, 163
See application file for complete search history.

(56) References Cited

U.S. PATENT DOCUMENTS

| 4,365,301 | A |  | 12/1982 | Arnold et al. |  |
| 4,408,933 | A | * | 10/1983 | Tomita et al. | 408/8 |

(Continued)

FOREIGN PATENT DOCUMENTS

EP    0 903 198    3/1999

(Continued)

OTHER PUBLICATIONS

Machine Translation of JP 6-106457, which JP '457 was published on Apr. 19, 1994.*

(Continued)

*Primary Examiner* — Erica E Cadugan
(74) *Attorney, Agent, or Firm* — Staas & Halsey LLP (57) ABSTRACT

An ultra-precision machine tool capable of accurately detecting a machining start position, in which movable axes are supported by fluid bearings. A workpiece is mounted on a rotary table of a B axis, and the rotary table is mounted on an X axis that is a linear motion axis. A tool is mounted on a Y axis. The Y axis is mounted on a Z axis. The X axis is moved reciprocally each time the Z axis is moved a predetermined amount, a machining surface of the workpiece is scanned, and it is determined whether or not position deviation of the X, Y and B axes reaches or exceeds a reference value. The Y axis is driven and the tool is moved toward the workpiece a predetermined amount, and the above-described scan is performed. When the position deviation of the X, Y and B axes reaches or exceeds the reference value it is determined that contact between the tool and the workpiece has occurred, and this contact point is stored as the machining start position, the Y axis is skipped, and the tool is moved a predetermined amount in a direction away from the workpiece, thus enabling a point of maximum protrusion from the machining surface of the workpiece to be simply detected as the machining start point.

11 Claims, 4 Drawing Sheets

U.S. PATENT DOCUMENTS

| | | | |
|---|---|---|---|
| 4,428,055 A | | 1/1984 | Zurbrick et al. |
| 4,818,925 A | * | 4/1989 | Lahm et al. ................. 318/567 |
| 5,189,806 A | | 3/1993 | McMurtry et al. |
| 6,301,520 B1 | * | 10/2001 | Hayashi ........................ 409/231 |
| 2008/0125015 A1 | * | 5/2008 | Kawai et al. ................... 451/11 |
| 2008/0201005 A1 | * | 8/2008 | Hon et al. ..................... 700/109 |
| 2009/0030637 A1 | * | 1/2009 | Kawai et al. .................... 702/94 |
| 2009/0033271 A1 | * | 2/2009 | Hon et al. ..................... 318/640 |
| 2009/0292503 A1 | * | 11/2009 | Hon et al. ..................... 702/168 |
| 2010/0030368 A1 | * | 2/2010 | Hon et al. ..................... 700/195 |

FOREIGN PATENT DOCUMENTS

| | | |
|---|---|---|
| GB | 2 255 636 | 11/1992 |
| JP | 6-106457 | 4/1994 |
| JP | 6-170698 | 6/1994 |
| JP | 9-11079 | 1/1997 |
| JP | 9-161674 | 6/1997 |
| JP | 11-165240 | 6/1999 |
| JP | 2002-328707 | 11/2002 |
| JP | 2003-205439 | 7/2003 |
| JP | 2004-034259 | 2/2004 |
| JP | 2004-034278 | 2/2004 |
| JP | 2005-103669 | 4/2005 |
| JP | 2005-324261 | 11/2005 |

OTHER PUBLICATIONS

Extended European Search Report, mailed Feb. 7, 2008 and issued in corresponding European Patent Application No. 07119066.4-1239.

Japanese Notice of Reasons for Rejection mailed Oct. 24, 2010, in the corresponding Japanese Application No. 2006-295216, (3 pages) (English translation 3 pages).

Japanese Patent No. JP4276252 for the corresponding Japanese Application No. 2006-295216, 2009.

Japanese Office Action issued on Oct. 24, 2008 in corresponding Japanese Patent Application No. 2006-295216.

* cited by examiner

MACHINE TOOL HAVING FUNCTION OF DETECTING CONTACT BETWEEN TOOL AND WORKPIECE

BACKGROUND OF THE INVENTION

1. Field of the Invention

The present invention relates to a machine tool that performs ultra-precise machining for which machining accuracy in nano-units is required, and more particularly to a machine tool capable of accurately determining a machining start position.

2. Description of Related Art

In a machine tool that performs ultra-precise machining for which machining accuracy measured in nano-units is required, when performing scribing or the like on a machining surface, in order to improve machining accuracy it is necessary to determine a position of a tool tip point with respect to the workpiece accurately and start machining, and it is also necessary to set a coordinate position of the workpiece machining start point with nano-unit accuracy.

Conventionally, the tool tip position is detected using a sensor or other such special tool detection device or a microscope. As methods of detecting the position of the workpiece, an invention is known that limits an output torque of a rotary actuator and advances the tool toward the workpiece, and in a torque-over state, and moreover when a skip deviation amount exceeds a preset position deviation, skips movement instruction and stops any succeeding movement instruction (see, for example, JP2002-328707A).

As a method that detects the position of the tool with respect to the workpiece, the position of the tool can be detected with the tool detection device used conventionally but the position of the workpiece cannot be ascertained accurately. In addition, with a tool having a sharp tip, the true position of the tip cannot be detected.

Moreover, when detecting using a microscope, a distance between a blade tip and the workpiece is measured and the tool can be brought very close to the workpiece. However, given the limited focal depth of the microscope, as machining progresses sometimes the blade tip can no longer be seen.

In addition, limiting the output torque of the actuator such as a motor that drives the tool and moving the tool toward the workpiece, in a torque-over state obtaining the position when the position deviation exceeds the skip deviation amount, and measuring the workpiece position with respect to the tool as with the invention described in JP2002-328707A, the torque in the torque-over state acts on the tool and the workpiece. In a machine tool that machines ultra-precisely with a machining accuracy measured in nano-units, bearings of movable axes are comprised of fluid bearings such as air bearings, in other words, frictionless bearings. As a result, even a slight force exerted on the movable axes, because the movable axes move, in a torque-over state like that described in JP2002-328707A, when a state is detected in which the position deviation has exceeded a predetermined value, the possibility increases that the workpiece or tool has already moved from a contact position for that workpiece and tool, making it difficult to determine that position with nano-unit accuracy.

SUMMARY OF THE INVENTION

The present invention provides a machine tool having a workpiece contact detection function capable of detecting accurately a machining start position in an ultra-precision machine tool comprised of frictionless movable axes supported by fluid bearings.

A machine tool of the present invention performs machining on a surface of a workpiece by moving a tool relative to the workpiece from a start point of the machining using movable axes supported by fluid bearings. The machine tool comprises: position detectors for detecting respective positions of the movable axes; position deviation detecting means that detects respective position deviations of the movable axes as differences between commanded positions and the detected positions of the movable axes; contact point detecting means that scans the surface of the workpiece by moving the tool relative to the workpiece using the movable axes so as to detect contact between the tool and the workpiece based on the position deviations detected by the position deviation detecting means, and automatically sets and stores positions of the movable axes at the time of detection of the contact as the start point of the machining; and retreating means that retreats the tool away from the workpiece using the movable axis on which the tool is mounted when the contact is detected.

The movable axes may include linear axes and a rotary axis, and the position detectors for detecting positions of the linear axes may comprise linear scales having detection resolution of 10 nm or less.

The position detector for detecting a position of the rotary axis may comprise a rotary encoder having resolution of $1/10{,}000$ degree or less and the rotary axis may be directly coupled to and directly driven by a motor.

The contact point detecting means may move the tool relative to the workpiece at a constant velocity using one of the movable axes and may detect the contact between the tool and the workpiece based on the position deviation of the one of the movable axes.

The movable axes may include an X axis as a linear axis, a B axis as a rotary axis arranged on the X axis to be perpendicular thereto, a Y axis as a linear axis perpendicular to the X axis and parallel to the B axis, and a Z axis as a linear axis perpendicular to the X axis and the Y axis. The tool may be mounted on the Y axis.

The workpiece may be mounted on a rotary table on the rotary B axis, and the contact point detecting means may linearly move the workpiece using the X axis to detect contact between the tool and the workpiece based on variation of the position deviation of any of the X axis, the B axis and the Y axis.

The movable axes may be automatically moved to the positions set and stored by the contact point detecting means when starting the machining.

The contact point detecting means may scan an X-Z plane of the workpiece by the tool by reciprocally driving the X axis each time the Z axis is driven by a predetermined amount with the Y axis and the B axis stopped, and may repeatedly perform the scanning each time the Y axis is driven by a predetermined amount such that the tool is moved closer to the workpiece until contact between the tool and the workpiece is detected.

An additional linear axis parallel to the X axis may be provided on the Y axis, the workpiece may be mounted on a rotary table on the rotary B axis and the contact point detecting means may move the tool reciprocally in a direction parallel to the X axis using the additional linear axis so as to detect the contact between the tool and the workpiece.

Servo gains of servo controllers for controlling the movable axes may be set to lower values to have greater susceptibility to external disturbances so that contact between the tool and the workpiece is detected with a smaller force exerted on the tool or the workpiece.

The machine tool may further comprise detecting means for detecting an abnormal increase of any of the position deviations, and the retreating means may retreat the tool from the workpiece when the abnormal increase is detected by the detecting means.

The detecting means may output a signal indicative of the movable axis on which the abnormal increase of the position deviation is detected.

In an ultra-precision machine tool comprised of frictionless movable axes supported by fluid bearings, even a slight force exerted on the movable parts causes the movable parts to move, which is used to detect an increase in position deviation. As a result, that portion which protrudes the most from a machining surface is detected simply by contact between the tool and the workpiece, and that contact point can be detected as the location of the machining start point.

DETAILED DESCRIPTION

A detailed description will now be given of one embodiment of the present invention, with reference to the drawings.

Figure 1:
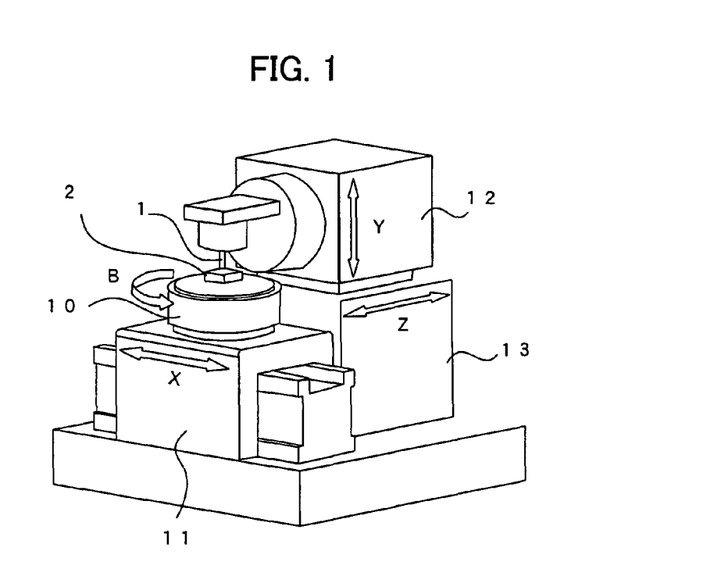
FIG. 1 is a schematic diagram of a machine tool that performs ultra-precise machining according to one embodiment of the present invention.

FIG. 1 is a schematic diagram of a machine tool that performs ultra-precise machining according to one embodiment of the present invention. In the present embodiment, as movable axes there are three linear motion axes (hereinafter "linear axes") and one rotary axis. A rotary table 10 is mounted on an X-axis member 11, which is a linear axis driven in the direction of a horizontal direction X axis. The rotary table 10 rotates about a B axis, which is an axis disposed orthogonal to the X axis. A workpiece 2 that is an object to be machined is mounted on the rotary table 10. A tool 1 is mounted on a Y-axis member 12, which is a linear axis that moves in the direction of a Y axis parallel to the rotary B axis. Further, the Y-axis member 12 is mounted on a Z-axis member 13, which is a linear axis that moves in the direction of a Z axis orthogonal to the X axis and the Y axis. The workpiece 2 moves in a straight line in the X-axis direction as well as rotates about the B axis. In addition, the tool 1 moves in a straight line in the Y-axis direction and the Z-axis direction. The workpiece 2 is machined by the tool 1 through the movement of the X, Y Z and B axes.

It should be noted that, in the present embodiment, motors that drive the linear X axis, Y axis and Z axis are linear motors, whereas a motor that drives the rotary B axis is a rotary servo motor. The rotary table 10 and the rotary servo motor are coupled directly to each other in a direct drive configuration.

Bearings for the X axis, Y axis, Z axis and B axis are fluid bearings (air bearings).

Figure 2:
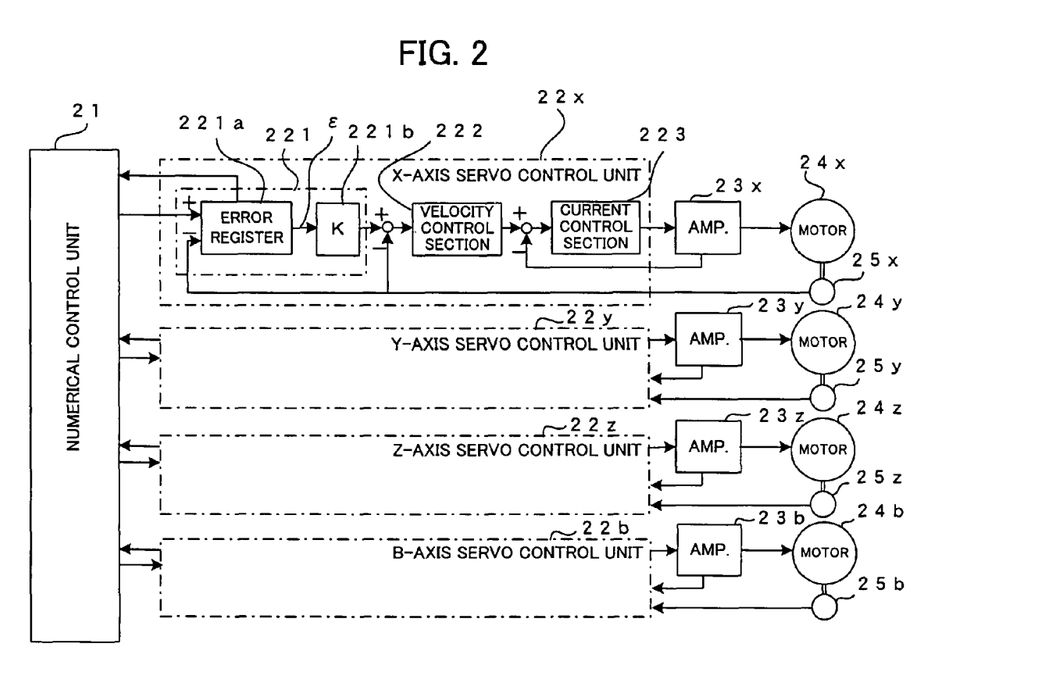
FIG. 2 is a block diagram of main parts of a controller that controls the machine tool of the embodiment.

FIG. 2 is a block diagram of principal parts of a numerical controller for controlling the machine tool. A numerical control unit 21 reads and executes a machining program and outputs motion commands for the axes to axis servo control units 22x-22b. As is described with respect to an X-axis servo control unit 22x that controls a motor 24x for the X axis, the servo control unit 22x-22b each include a position control section 221, a velocity control section 222, a current control section 223 and so forth, with servo control units 22y, 22z and 22b for the Y axis, Z axis and B axis, respectively, having the same construction as the X-axis servo control unit 22x described above.

The position control units 221 of the axis servo control units 22x-22b are each comprised of an error register 221a and a position gain K item 221b. With the error register 221a these obtain a position deviation ε that is a difference between a position commanded for each of the axes by the numerical control section 21 and a position that is fed back from position/velocity detectors 25x-25b that detect position and velocity, multiply the position deviation ε by the position gain K and obtain a command velocity, reduce a velocity fed back from the position/velocity detectors 25x-25b with the velocity control section 222 to obtain a velocity deviation, and carry out feedback control of the velocity in the form of proportional/integrated processing or the like to obtain a current command (torque command). Then, at the current control section 223, current feedback control is carried out based on the current command obtained as described above and the current fed back from amplifies 23x-23b, and the axis motors 24x-24b are driven via the amplifiers 23x-23b.

In the present embodiment, the linear axes X axis, Y axis and Z axis motors 24x, 24y and 24z are linear motors. Moreover, the motor 24b that drives the rotary B axis is a rotary servo motor, and as described above directly drives the rotary table 10. In addition, positions of the movable members driven by the linear motors 24x, 24y and 24z of the linear axes X axis, Y axis and Z axis are detected by linear scale position/velocity detectors 25x, 25y and 25z. The machine tool of the present embodiment performs ultra-precise machining, and therefore the linear scale position/velocity detectors 25x, 25y and 25z are high-accuracy detectors with a detection resolution capability of 10 nanometers or smaller. In the case of the rotary axis B, a position/velocity detector 25b comprised of a rotary encoder or the like and mounted on the server motor 24b for the rotary B axis also is a high-accuracy detector, having a resolution capability of 1/10,000 of a degree or less.

The above-described machine tool configuration, and the configuration of the control unit that controls such machine tool, is the same as that of a conventional machine tool for ultra-precise machining and a controller therefor. The present invention provides the machine tool with a contact detection function of detecting contact between the tool and the workpiece so that a machining start position is determined with high accuracy.

Figure 3A:
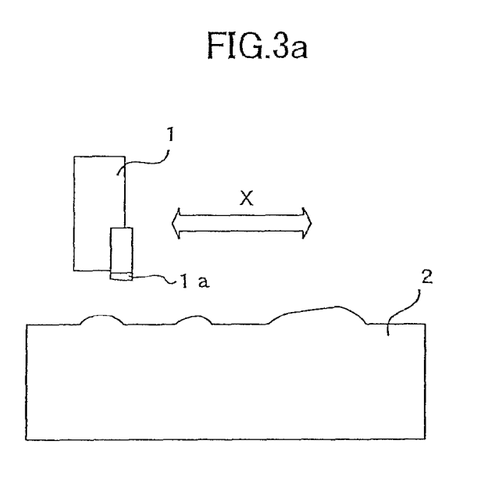
FIGS. 3a and 3b are diagrams illustrating a machining start point coordinate position detection operation of the machine tool of the embodiment.
Figure 3B:
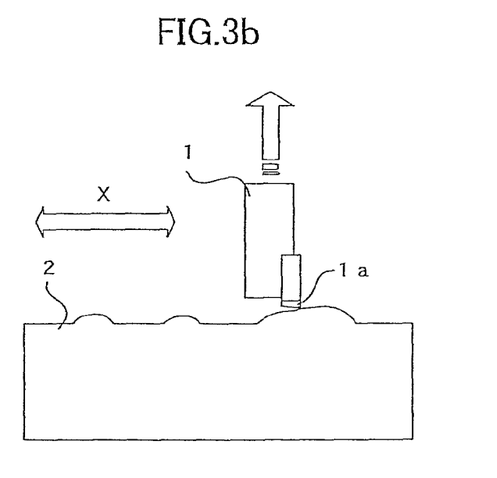

FIGS. 3a and 3b are diagrams illustrating a machining start point coordinate position detection operation in the present embodiment. When performing ultra-precise surface machining on the workpiece 2, it is necessary to execute surface machining from that portion which is closest to the tip of the tool in the direction in which the tool cuts into the workpiece, in keeping with the unevenness of the machining surface that is to be machined. In the present embodiment, the vertical direction Y-axis direction is the direction in which the tool 1 cuts into the workpiece, and the horizontal X-Z plane is the machining plane. In this case, when the tool 1 is lowered in the Y-axis direction (toward the workpiece 2) and given a predetermined cut-in for cutting, any portion that protrudes from the machining surface necessitates cutting in more than necessary and therefore places an excessive load on the tool.

In order to prevent such a situation, it is necessary to detect the portion that protrudes the most (the portion that protrudes in the Y-axis direction toward the tool) and to commence machining from this portion.

As shown in FIG. 3a, the tool 1 is positioned at a predetermined position and the workpiece 2 is moved reciprocally in the X-axis direction, and it is determined whether or not a tip 1a of the tool 1 contacts the workpiece 2. If the tip 1a of the tool 1 does not contact the workpiece 2, then the tool 1 is moved a predetermined amount in the Z-axis direction, after which the operation of moving the workpiece 2 reciprocally in the X-axis direction is repeatedly executed and the workpiece 2 machining surface area is scanned. Then, as shown in FIG. 3b, when the tip 1a of the tool 1 contacts the highest part of a projecting portion of the workpiece 2, that coordinate position is made the machining start position.

In the present embodiment, contact between the tool 1 and the workpiece 2 is detected by an increase in the position deviation of the axes.

As described above, the machine tool of the present embodiment employs fluid bearings for the linear axes X, Y and Z and the rotary axis B, with virtually no friction. As a result, when the tool 1 and the workpiece 2 contact each other and a load is exerted on the tool 1 or the workpiece 2, the load causes the X axis, the Y axis and the B axis to move. This movement causes the position deviation E between a commanded position and a detected position to increase, and therefore contact between the tool 1 and the workpiece 2 can be detected by detecting this increase in position deviation $\epsilon$.

Figure 4A:
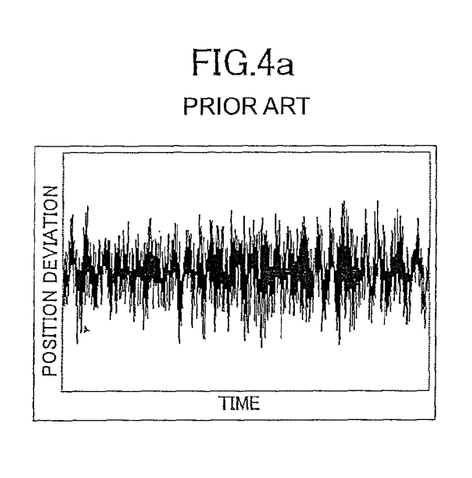
FIGS. 4a and 4b are diagrams showing position deviation detected when moving a non-fluid bearing movable axis and a fluid bearing movable axis.
Figure 4B:
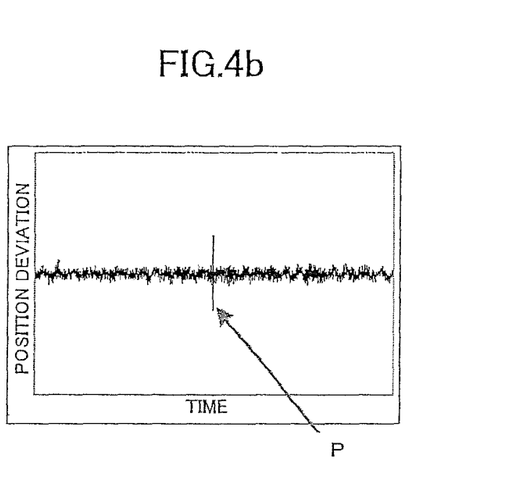

FIG. 4a shows measurement of position deviation during movement of the movable axes (X axis, Y axis, Z axis and B axis) when using conventional bearings such as ball bearings, without using fluid bearings as the bearings for the movable axes. Position deviation occurs, caused by frictional resistance generated with the movement of the movable axes. By contrast, FIG. 4b shows measurement of position deviation when using fluid bearings as the bearings for the movable axes and the movable axes are moved. Since there is virtually no friction, fluctuation in position deviation is much reduced compared to that shown in FIG. 4a. It should be noted that, in FIG. 4b, the point indicated by reference character P indicates the point at which the tool 1 contacts the workpiece 2 and the position deviation increased.

As shown in FIG. 4b, the movable axes supported by fluid bearings show virtually no position deviation. With movable axes such as these, position deviation occurs when even a slight force is exerted on them, and the difference between position deviation when there is no load exerted and position deviation when there is a load exerted is therefore substantial. As a result, it is easy to set a comparison reference value for detecting whether or not a load is exerted on the movable axes using position deviation.

In FIG. 4b, if a value that is approximately halfway between the size of the position deviation when no load is exerted and the size of the position deviation when a load is exerted is set as the comparison reference value, then exertion of a load on the movable axes can be detected when a position deviation greater than the reference value occurs. However, if such reference value is applied in the case of movable axes supported by ordinary bearings that do not use fluid bearings (i.e., like those shown in FIG. 4a), position deviation generated by friction also exceeds the reference value, with a risk that position deviation generated by friction might be erroneously detected as position deviation generated by contact between the tool and the workpiece. However, in the present invention, because fluid bearings are used, contact between the tool and the workpiece can be detected in states of small position deviation.

Figure 5:
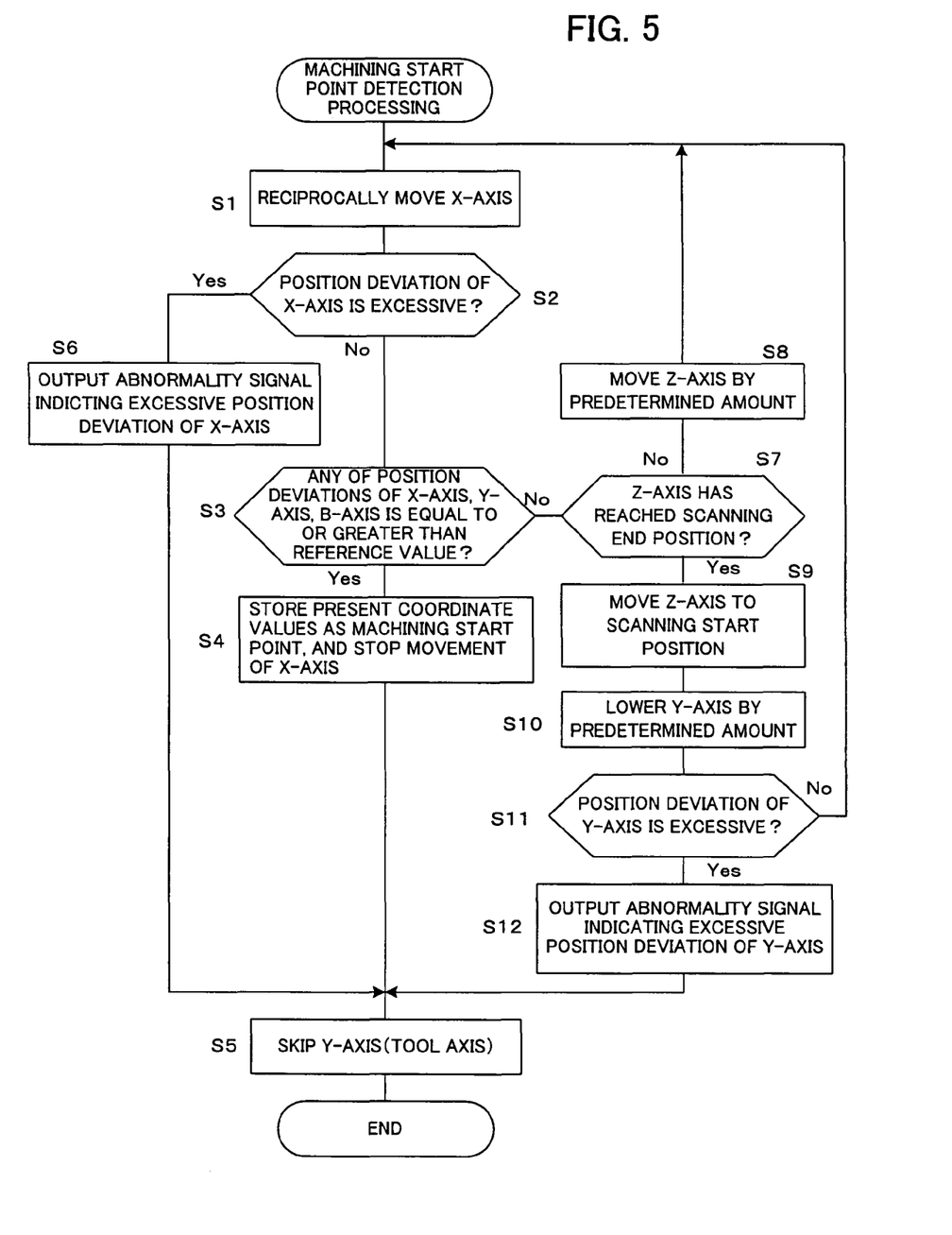
FIG. 5 is a flow chart illustrating a machining start point detection process algorithm of the machine tool of the embodiment.

A description is now given of a machining start point detection process of the present embodiment, with reference to FIG. 5.

FIG. 5 is a flow chart illustrating a machining start point detection process algorithm that a processor provided in the numerical control section 21 executes.

First, a stroke amount in the X-axis direction and a stroke amount in the Z-axis direction of the X-Z plane in which surface machining of the workpiece 2 is to be carried out are set, and the rotary axis B is positioned by manual feed so that one side of a scanning area that is the machining surface of the workpiece 2 is parallel to the X axis. In addition, the X axis and the Z axis are positioned at a coordinate position that coincides with a scanning start point of the scanning area that the tool 1 scans. Then, when a machining start point detection command is input using manual input means such as a keyboard, not shown, the processor of the numerical controller commences the process shown in FIG. 5.

The X axis motor is driven at a predetermined constant velocity to move the X axis reciprocally a set stroke amount (Step S1). During the reciprocal movement of the X axis, it is determined whether or not a position deviation of the X axis obtained by the X-axis error register 221a, which is a difference between a commanded position of the X axis and an actual position of the X axis fed back from the position/velocity detector, is of an excessive position deviation not less than a predetermined value for detecting an abnormality (Step S2). This determination is for the purpose of detecting when the workpiece and the tool 1 contact each other due to a setting value or an operating error. When such excessive position deviation is detected, an abnormality signal indicating an excessive position deviation of the X axis is outputted and displayed on a display device or the like of the numerical controller (Step S6), and the procedure proceeds to Step S5 where the Y axis on which the tool 1 is mounted is skipped. In other words, processing of separating the tool 1 from the workpiece is carried out, in which the Y axis is moved in a direction away from the workpiece 2 by an amount designated in advance as a skip amount.

By contrast, when in Step S2 it is determined that the position deviation of the X axis is not excessive, then the processor reads in the respective position deviations $\epsilon$ obtained by the error registers 221a of the X axis, the Y axis and the B axis and determines whether or not any of the position deviations $\epsilon$ meets or exceeds the set reference value. The reference value is set in order to detect contact of the tool tip 1a of the tool 1 against the workpiece 2, and as shown in FIG. 4b a position deviation amount slightly larger than the position deviation generated when the tool and the workpiece are not in contact with each other is set as the reference value.

The X axis is driven at a constant velocity and the workpiece 2 is moved at a constant velocity. Therefore, when the tool 1 contacts the workpiece 2, the movement of the workpiece 2 is stopped, causing the position deviation to increase. Accordingly, contact between the tool 1 and the workpiece 2 is detected on the basis of the fact that the position deviation of the X axis meets or exceeds the set reference value (Step S3).

In addition, although the Y axis and the B axis are positioned at predetermined positions, the Y axis and the B axis are also supported by fluid bearings, and thus even a slight force exerted on these axes causes them to move. As a result, when the workpiece 2 and the tool 1 contact each other, if at that time a force is exerted on the tool 1 in the Y-axis direction, then the Y axis linear motor moves, shifting the Y axis from its commanded position and generating a position deviation. Similarly, if a force that attempts to rotate the workpiece 2 is exerted when the workpiece 2 and the tool 1 contact each other, the B axis servo motor moves, shifting the B axis from its commanded position and generating a position deviation. Accordingly, by detecting that the position deviations of the Y axis and the B axis are equal to or greater than the reference value, contact between the tool 1 and the workpiece 2 is detected. In other words, contact between the tool 1 and the workpiece 2 is detected depending on whether or not position deviation of any of the X axis, the Y axis, and the B axis is equal to or greater than the reference value (Step S3).

If in Step S3 it is determined that the position deviations of the X axis, the Y axis, and the B axis have not reached or exceeded the reference value, then it is determined whether the Z axis position has reached a scanning end position or not (Step S7). If the Z axis has not reached the scanning end position, the Z axis is moved by a predetermined amount (Step S8) and the process returns to Step S1 and the above-described processes are repeated.

Thereafter, as long as the tool 1 and the workpiece 2 do not contact each other and it is not determined in Step S3 that the position deviation of either the X axis, the Y axis, or the B axis meets or exceeds the reference value, the processes of Steps S1, S2, S3, S7 and S8 are repeatedly executed.

Then, when the Z axis reaches the scanning end position (Step S7), the Z axis is positioned at a scanning start position (Step S9), the Y axis is lowered by a predetermined amount in a direction that brings the tool 1 closer to the workpiece 2 (Step S10), and at this time it is determined whether the position deviation amount obtained by the Y axis error register 221*a* is excessive or not (Step S11). If the position deviation amount is identified as excessive, then an abnormality signal indicating an excessive position deviation of the Y axis is outputted and displayed on the display device or the like of the numerical controller (Step S12), the procedure proceeds to Step S5, and the Y axis on which the tool is mounted is skipped. In other words, a process of separating the tool 1 from the workpiece is carried out, in which the Y axis is moved in a direction away from the workpiece 2 by an amount designated in advance as a skip amount.

By contrast, if in Step S11 it is determined that the position deviation amount of the Y axis is not excessive, then the process returns to Step S1 and the processes of Step S1 and thereafter are executed. In other words, the tool 1 is moved toward the workpiece 2 a predetermined amount and a scanning range scanned.

Thereafter, while successively moving the tool 1 toward the workpiece 2 in predetermined amounts by moving the Y axis in predetermined amounts, the scanning range is scanned. If during this scanning operation the tip 1*a* of the tool 1 contacts the projecting portion of the workpiece 2 and it is determined in step 3 that the position deviation of either the X axis, the Y axis or the B axis is equal to or greater than the reference value, then it is determined that there is contact between the tool 1 and the workpiece 2. The coordinate positions of the respective axes at this time are then set and stored as coordinate positions of a machining start point, and at the same time the movement of the X axis is stopped (Step S4). Then, the procedure proceeds to Step S5, the skip process described above is carried out, the Y axis is skipped a skip amount in a direction away from the workpiece 2, the tool 1 is separated from the workpiece 2, and the machining start point detection process is ended.

As described above, the machining start point is detected and the positions of the movable axes at the machining start point, that is, their coordinate positions, are stored in a storage unit of the numerical control section 21, after which, when a machining start command for starting machining is input to the numerical controller, the numerical controller processor reads out the stored axes positions, positions the axes at the read-out positions, and starts machining of the workpiece 2.

In the machining start point detection process described above, Step S2 and Step S11 are designed to prevent damage to the tool caused by a collision between the tool 1 and the workpiece 2 due to operating error or the like. Therefore, these Steps are not essential to the machining start point detection process and may thus be omitted. In that case, the processes of Steps S2, S6, S11 and S12 are unnecessary, and the process may move from Step S1 to Step S3, and from Step S11 to Step S1.

Thus, as described above, the present invention detects contact between the tool 1 and the workpiece 2 by an increase in position deviation. Therefore, when performing the machining start point detection process illustrated in FIG. 5, it is more effective to execute such process by lowering the servo gain, such as the position gains K of the position control sections 221 of the axis servo control units, and the proportional gains, integral gains, and so forth of the velocity control sections 222 of the axis servo control units, to something smaller than during normal machining. For example, when the position gain K is lowered below normal and set, the velocity command output in proportion to the position deviation decreases and the current command (torque command) also decreases. As a result, when the tool 1 and the workpiece 2 contact each other, the position deviation increases in a state in which the force exerted on the tool 1 and the workpiece 2 is small, enabling detection of contact between the tool 1 and the workpiece 2 with little load.

It should be noted that although in the embodiment described above an example is given of machining by driving the X axis and moving the workpiece 2, the present invention is also applicable in an arrangement in which the X axis is not provided, or in which the X axis is not moved, but instead an additional axis that moves parallel to the X axis is provided on the Y axis, for example, when attempting to carry out scribing or the like, in which large numbers of tiny straight grooves are machined.

Figure 6:
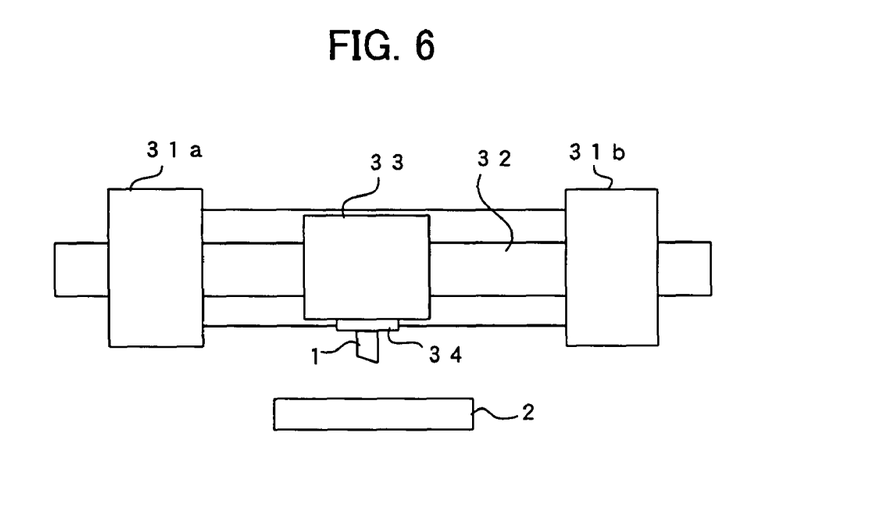
FIG. 6 is a schematic diagram of one example of an additional linear axis used in scribing.

FIG. 6 shows one example of an additional linear axis used in scribing mounted on the Y-axis member 12.

As shown in FIG. 6, a guide member 32 that guides a linear motion member 33 is disposed between two fixed members 31*a* and 31*b*. The linear motion member 33 is supported by fluid bearings (air bearings) on the guide member 32, with a linear motor provided on the guide member 32 and the linear motion member 33 in the form of a coil at one end and a magnet at another end. The fixed members 31*a*, 31*b* are mounted on the Y-axis member 12. Although the guide member 32 may be fixedly mounted on the fixed members 31*a*, 31*b*, in the example shown in FIG. 6, as shown in Japanese Patent Application No. 2005-325052 (JP2007-130712A), the guide member 32 is supported by fluid bearings (air bearings) on the fixed members 31*a*, 31*b*. The tool 1 is mounted on the linear motion member 33 via a piezoelectric element 34. The piezoelectric element 34 is driven, the tool 1 is given a cut-in amount with respect to the workpiece 2, the linear motion member 33 is advanced, grooving is performed, driving of the piezoelectric element 34 is stopped, the tool 1 is withdrawn by the cut-in amount, and the linear motion member 33 is withdrawn. Grooving by scribing is carried out by repetition of the foregoing process.

With use of this additional linear axis as well, when detecting the machining start point, as with the embodiment described above, the Y axis is successively moved predetermined amounts toward the workpiece 2, the linear motor is driven and the linear motion member 33 is moved reciprocally parallel to the X axis and a machining area of the workpiece 2 is scanned, during which scanning it is detected if the position deviation of the stopped X axis, or the position deviation of the rotary B axis which is the same as the embodiment described above, or further, the position deviation of the Y axis has reached or exceeded the reference value, contact between the tool 1 and the portion of maximum protrusion of the workpiece 2 is detected and the coordinate positions of the axes at the time of such contact are taken as the machining start point position.

What is claimed is:

1. A machine tool in which movable axes are composed of linear axes of X-, Y- and Z-axes, each driven by a linear motor, and a rotary B axis driven by a rotary motor, position detectors for detecting respective positions of the linear axes comprise linear scales each having resolution of 10 nanometer or less, a position detector for detecting a position of the rotary axis comprises a rotary encoder having resolution of $1/10,000$ of a degree or less, each of the movable axes is supported by a fluid bearing, and a machining tool is moved relative to a workpiece by driving the movable axes so as to perform ultra-precise machining on the workpiece by means of the machining tool, said machine tool comprising;

position deviation detecting means for detecting position deviations which are differences between commanded positions to the movable axes and the positions detected by the position detectors;

contact point detecting means for scanning the surface of the workpiece by moving the machining tool relative to the workpiece by driving the movable axes so as to detect contact between the machining tool and the workpiece based on the position deviations detected by said position deviation detecting means, and for automatically setting and storing positions of the movable axes at the time of detection of the contact as the start point of the machining; and retreating means that retreats the machining tool away from the workpiece using the movable axis on which the machining tool is mounted when the contact is detected.

2. The machine tool according to claim 1, wherein said contact point detecting means moves the machining tool relative to the workpiece at a constant velocity using one of the movable axes and detects the contact between the machining tool and the workpiece based on the position deviation of the one of the movable axes.

3. The machine tool according to claim 1, wherein the B axis as a rotary axis is arranged on the X axis to be perpendicular thereto, the Y axis is perpendicular to the X axis and parallel to the B axis, and the Z axis is perpendicular to the X axis and the Y axis.

4. The machine tool according to claim 3, wherein the machining tool is mounted on the Y axis.

5. The machine tool according to claim 3, wherein the machining tool is mounted on the Y axis, and the workpiece is mounted on a rotary table on the rotary B axis, and said contact point detecting means linearly moves the workpiece using the X axis, to detect contact between the machining tool and the workpiece based on variation of the position deviation of any of the X axis, the B axis and the Y axis.

6. The machine tool according to claim 5, wherein said contact point detecting means scans an X-Z plane of the workpiece by the machining tool by reciprocally driving the X axis each time the Z axis is driven by a predetermined amount while stopping the Y axis and the B axis and repeatedly performs the scanning each time the Y axis is driven by a predetermined amount such that the machining tool is moved closer to the workpiece until contact between the machining tool and the workpiece is detected, thereby automatically setting and storing the positions of the respective movable axes at the time of detection of the contact as a start point of the machining.

7. The machine tool according to claim 3, wherein an additional linear axis parallel to the X axis is provided, the workpiece is mounted on a rotary table on the rotary B axis and said contact point detecting means moves the machining tool reciprocally in a direction parallel to the X axis using the additional linear axis so as to detect the contact between the machining tool and the workpiece.

8. The machine tool according to claim 1, wherein the movable axes are automatically moved to the positions set and stored by said contact point detecting means when starting the machining, and then machining is started.

9. The machine tool according to claim 1, wherein, during the scanning and contact detection, servo gains of servo controllers for controlling the movable axes are set to values that are lower than values at which the servo gains are set during the machining in order to have greater susceptibility to external disturbances so that contact between the machining tool and the workpiece is detected with a smaller force exerted on the machining tool or the workpiece than would be necessary with the servo gains set at the values during the machining.

10. The machine tool according to claim 1, further comprising detecting means for detecting an abnormal increase of any of the position deviations, wherein said retreating means retreats the machining tool from the workpiece when the abnormal increase is detected by said detecting means for detecting an abnormal increase of any of the position deviations.

11. The machine tool according to claim 10, wherein said detecting means for detecting an abnormal increase of any of the position deviations outputs, when detecting an abnormal increase of any of the position deviations, a signal indicative of the movable axis on which the abnormal increase of the position deviation is detected.

* * * * *

UNITED STATES PATENT AND TRADEMARK OFFICE
CERTIFICATE OF CORRECTION

PATENT NO.        : 7,905,691 B2
APPLICATION NO.   : 11/980391
DATED             : March 15, 2011
INVENTOR(S)       : Yonpyo Hon et al.

It is certified that error appears in the above-identified patent and that said Letters Patent is hereby corrected as shown below:

First Page Item 73 delete "Fanu" and insert -- Fanuc --, therefor.

Column 5, Line 27 delete "E" and insert -- $\epsilon$ --, therefor.

Column 8, Line 31 delete "which-the" and insert -- which the --, therefor.

Signed and Sealed this
Tenth Day of May, 2011

David J. Kappos
*Director of the United States Patent and Trademark Office*